United States Patent [19]
Chen

[11] Patent Number: 5,829,322
[45] Date of Patent: Nov. 3, 1998

[54] MULTIPURPOSE WIRE STRIPPER

[76] Inventor: Ching-Jen Chen, No. 71, Mai-Ning St., Tai-Shan Shiang, Taipei Hsien, Taiwan

[21] Appl. No.: 818,864

[22] Filed: Mar. 17, 1997

[51] Int. Cl.$^6$ ....................................................... H02G 1/12
[52] U.S. Cl. ............................................. 81/9.44; 30/91.2
[58] Field of Search ...................... 81/9.4, 9.44; 30/90.1, 30/90.6, 91.2

[56] References Cited

U.S. PATENT DOCUMENTS 5,150,522  9/1992  Gwo-Jiang ................................ 81/9.44

*Primary Examiner*—James G. Smith
*Attorney, Agent, or Firm*—Bacon & Thomas, PLLC

[57] ABSTRACT

A wire stripper including an elongated base and a pivoted arm pivoted together by a hinge pin, a torsional spring mounted around the hinge pin to force the rear ends of the elongated base and the pivoted arm apart, a first stripper unit mounted in the front ends of the elongated base and the pivoted arm and adapted for stripping off insulator of a coaxial cable, a second stripper unit mounted in the rear ends of the elongated base and the pivoted arm and adapted for stripping off insulator of an electric wire or telephone line, or insulator of individual conductors of an electric wire or telephone line, a lock device adapted for securing the rear ends of the elongated base and the pivot arm closed together, and a side guard rail at one side of the elongated base to stop the user's fingers from touching the second stripper unit.

6 Claims, 4 Drawing Sheets

MULTIPURPOSE WIRE STRIPPER

BACKGROUND OF THE INVENTION

The present invention relates to wire strippers, and more particularly to a multipurpose wire stripper adapted for stripping of insulators of different kinds and sizes of electric cables (coaxial cables, telephone lines, electric wires).

Regular wire strippers are designed for stripping off insulator of electric wires of a particular size. For stripping off insulators of electric wires of different sizes, different wire strippers shall be used. However, preparing a full set of wire strippers costs much money. Further, it is inconvenient to an electrician to carry a set of wire strippers with oneself. There are also known multipurpose wire strippers adapted for stripping off insulators of electric wires of different sizes. These multipurpose wire strippers have a plurality of stripper units adapted for stripping off insulators of electric wires of different sizes or cutting off conductors of electric wires. However, these multipurpose wire strippers are designed for stripping off insulators of electric wires of a particular type. If a multipurpose wire stripper is designed for stripping of insulators of telephone lines and insulators of conductors of telephone lines, it cannot be used for stripping off insulators of coaxial cables.

SUMMARY OF THE INVENTION

It is one object of the present invention to provide a multipurpose wire stripper which comprises a plurality of stripper units for processing electric cables of different sizes and different types. It is another object of the present invention to provide a multipurpose wire stripper which has guard means to stop the user's fingers from touching the cutters thereof. It is still another object of the present invention to provide a multipurpose wire stripper which has lock means adapted for locking the electric wire in position for stripping. It is still another object of the present invention to provide a multipurpose wire stripper which has a finger groove at a suitable location for the positioning of the fingers to operate the device.

DETAILED DESCRIPTION OF THE PREFERRED EMBODIMENT

Figure 1:
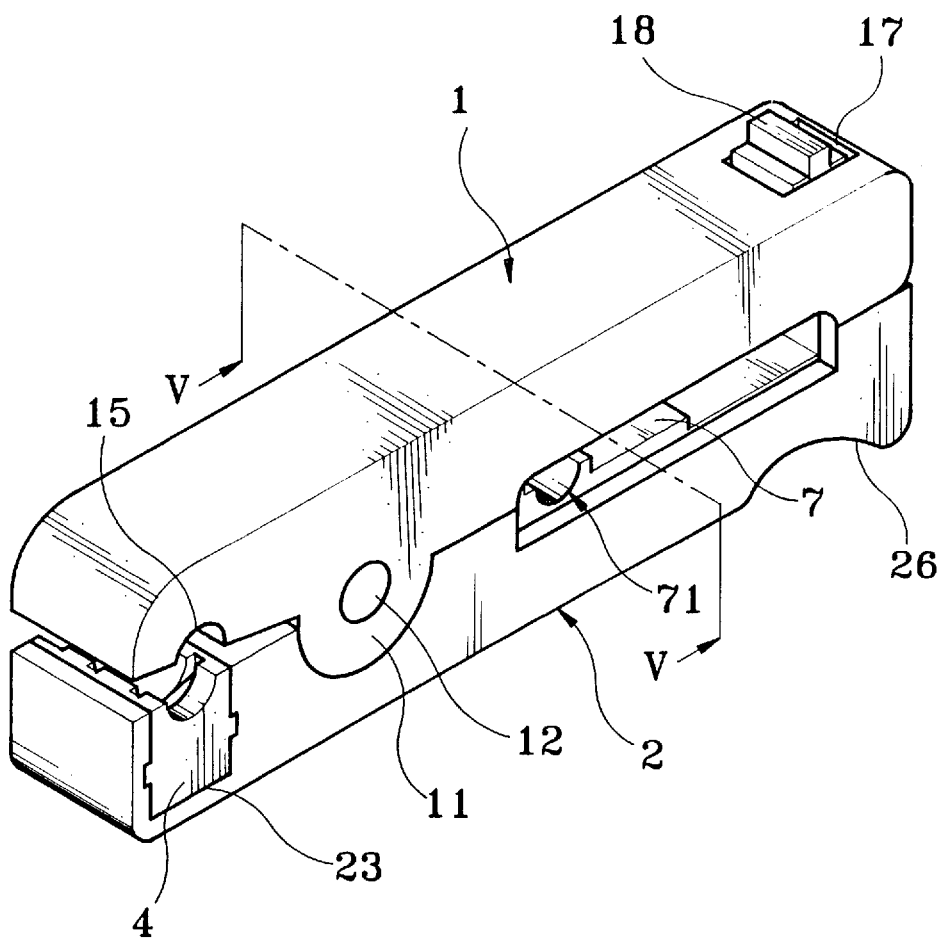
FIG. 1 is an elevational view of a multipurpose wire stripper according to the present invention.
Figure 2:
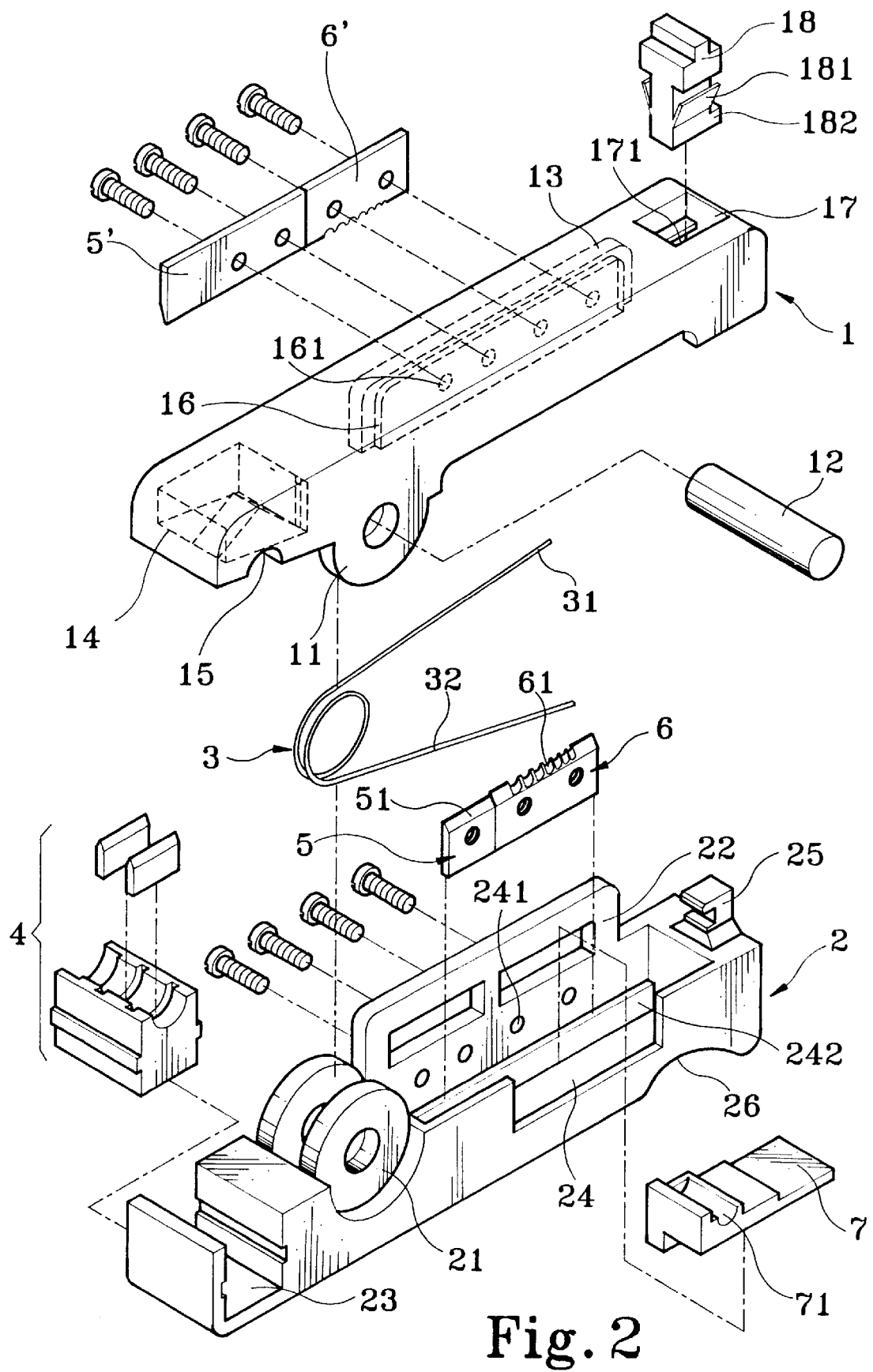
FIG. 2 is an exploded view of the multipurpose wire stripper shown in FIG. 1.

Referring to FIGS. 1 and 2, a wire stripper in accordance with the present invention comprises an elongated base 2 and a pivoted arm 1 hinged together. The elongated base 2 has two eyed lugs 21 near one end, namely, the front end. The pivoted arm 1 has two eyed lugs 11 disposed near one end, namely, the front end, and bilaterally pivoted to the eyed lugs 21 of the elongated base 2 by a hinge pin 12. A torsional spring 3 is mounted around the hinge pin 12, having two opposite ends 31;32 respectively stopped against the pivoted arm 1 and the elongated base 2 on the inside to force them apart. The elongated base 2 has a side guard rail 22 longitudinally disposed along one side, and a finger recess 26 transversely disposed at the bottom side of the rear end (remote from the eyed lugs 21) thereof. The pivoted arm 1 has an elongated receiving space 13 longitudinally disposed at one side, and adapted for receiving the side guard rail 22 when the elongated base 2 and the pivoted arm 1 are closed on each other. The wire stripper further comprises a first stripper unit, a second stripper unit, and a lock device.

The aforesaid first stripper unit comprises a trough 23 at the front end of the elongated base 2 in front of the eyed lugs 21, a downward opening chamber 14 at the front end of the pivoted arm 1 corresponding to the trough 23 of the elongated base 2, a transverse wire groove 15 at the bottom of the downward chamber 14, and a wire stripping jaw set 4 mounted in the trough 23 and adapted for stripping off coaxial cables of a particular diameter.

The aforesaid second stripper unit comprises a first chamber 24 longitudinally disposed at the elongated base 2 at the top side and having a longitudinal series of screw holes 241 at one side, a second chamber 16 longitudinally disposed at the pivoted arm 1 at the bottom side and having a longitudinal series of screw holes 161 at one side, an elongated partition plate 242 longitudinally mounted inside the first chamber 24, a pair of first cutters 5;5' and a pair of second cutters 6;6' respectively fastened to the screw holes 241;161 by screws, and a guide element 7 mounted in the first chamber 24 and stopped at one side of the elongated partition plate 242 opposite to the cutters 5;6. The guide element 7 has a wire groove 71, and is adapted for cutting conductors of a stripped cable. The first cutters 5;5' have a respective straight cutting edge 51 acting against each other. The second cutters 6;6' have a respective notched cutting edge 61 acting against each other.

The aforesaid lock device comprises a top recess 17 at the rear end of the pivoted arm 1, a through hole 171 through the top recess 17, a retainer block 18 mounted in the through hole 171, and a hook 25 raised from the rear end of the elongated base 2 at the top and adapted for hooking on the retainer block 18. The retainer block 18 comprises two springy locating strips 181 raised from two opposite sides and forced into engagement with the periphery wall of the through hole 171, and a hooked portion 182 at the bottom adapted for hooking up with the hook 25.

Figure 3A:
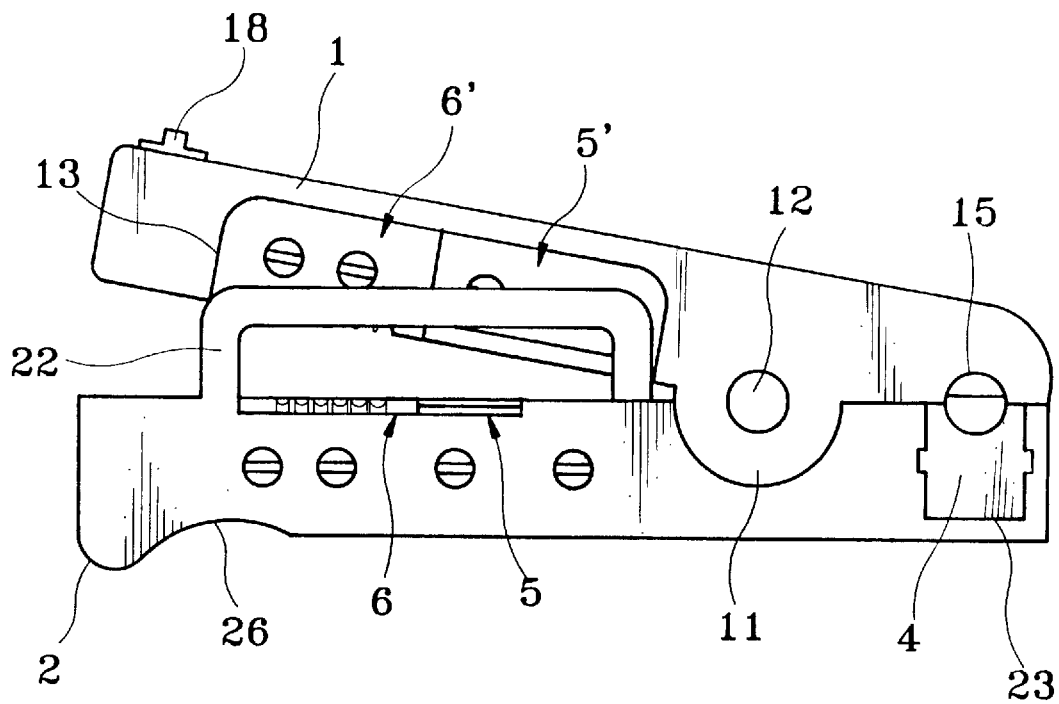
FIG. 3A is a side plain view of FIG. 1, showing the front ends of the elongated base and the pivoted arm closed, the front ends thereof opened.
Figure 3B:
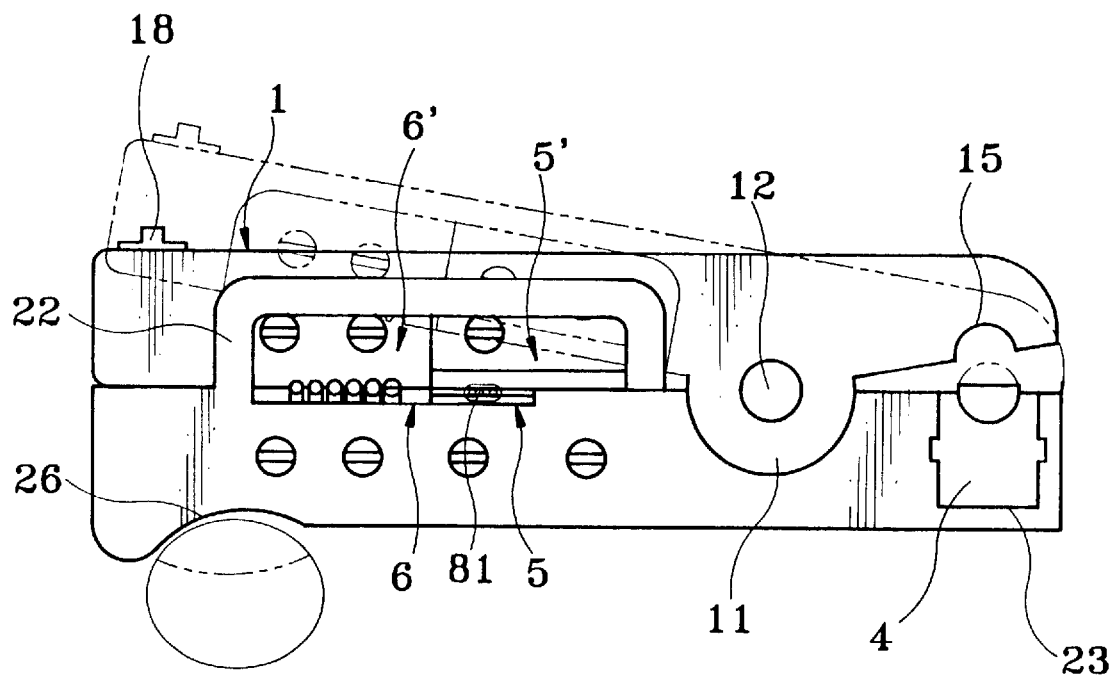
FIG. 3B is similar to FIG. 3A but showing the front ends of the elongated base and the pivoted arm opened, the front ends thereof closed.

Referring to FIGS. 3A and 3B, the spring force of the torsional spring 3 forces the rear ends of the elongated base 2 and the pivoted arm 1 apart, therefore the front ends of the elongated base 2 and the pivoted arm 1 are forced to close on each other. By turning the rear ends of the elongated base 2 and the pivoted arm 1 relative to each other, the first stripper unit can be opened and closed for permitting a coaxial cable to be put in the wire groove 15, and the insulator of the coaxial cable can be stripped off by the stripper jaw unit 4.

When the rear ends of the elongated base 2 and the pivoted arm 1 are pressed against each other, the first pair of cutters 5;5' are acted against each other for cutting off the insulator of an electric wire or telephone line, and the second pair of cutters 6;6' are acted against each other for stripping off the insulator of individual conductors of an electric wire or telephone line.

Figure 4:
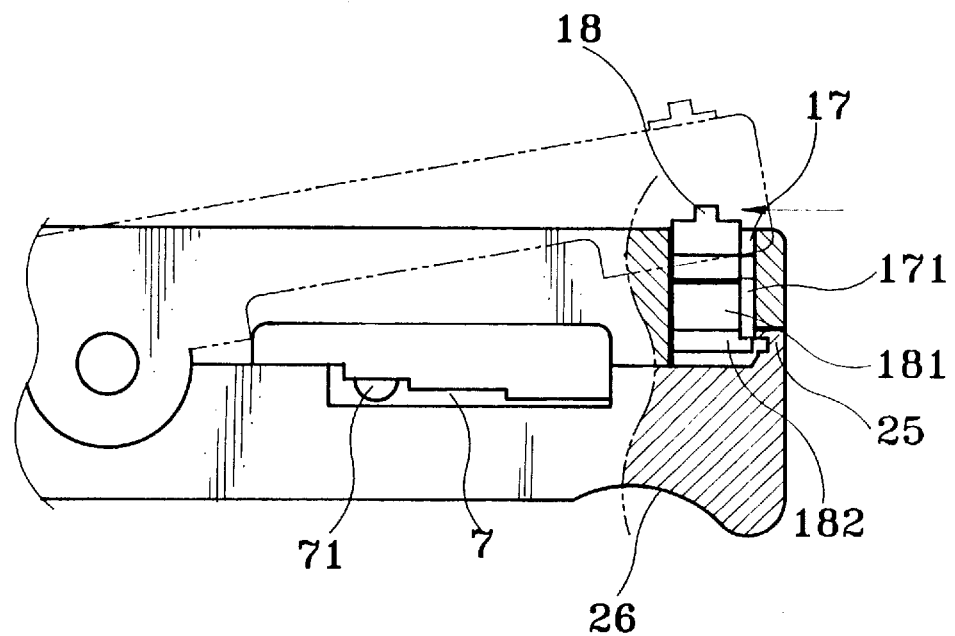
FIG. 4 is a partial view in an enlarged scale of the present invention, showing the retainer block and the hook engaged together.

Referring to FIG. 4, when a telephone line is retained in the second stripper unit for stripping, the retainer block 18 is moved in the through hole 171 to force its hooked portion 182 into engagement with the hook 25, permitting the rear ends of the elongated base 2 and the pivoted arm 1 to be firmly retained together, i.e., permitting the second stripper unit to be firmly retained in the closed condition, and therefore the insulator of the telephone line or the insulator of the individual conductors of the telephone line can be conveniently stripped off. Further, the side guard rail 22 stops the user's fingers from passing to the inside of the second stripper unit.

Figure 5:
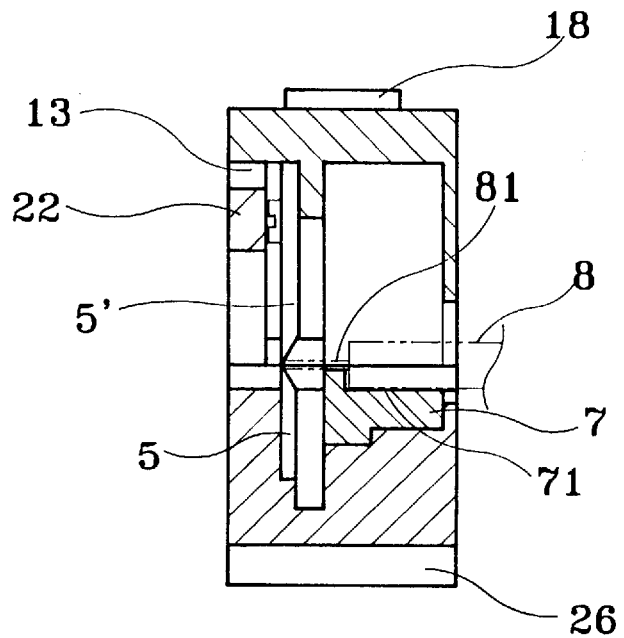
FIG. 5 is a sectional view taken along line V—V of FIG. 1.

Referring to FIG. 5, the cutting element 7 is adapted for cutting off the bare conductor 81 of an electric wire 8 at the desired length to fit a connector (not shown).

While only one embodiment of the present invention has been shown and described, it will be understood that various modifications and changes could be made thereunto without departing from the spirit and scope of the invention.

I claim:

1. A wire stripper comprising:

an elongated base having a front end, a rear end, a pair of eyed lugs near said front end, a finger groove transversely disposed at a bottom side of said rear end for the positioning of a user's fingers, and a side guard rail longitudinally disposed along one side of said rear end;

a pivoted arm having a front end, a rear end, a pair of eyed lugs near said pivoted arm front end bilaterally pivoted to the eyed lugs of said elongated base by a hinge pin, and an elongated receiving space adapted for receiving the side guard rail of said elongated base when the rear end of said elongated base is closed on the rear end of said pivoted arm;

a torsional spring having two opposite ends, said torsional spring mounted around said hinge pin, wherein said two opposite ends are respectively stopped at the rear ends of said pivoted arm and said elongated base to force said rear ends apart;

a first stripper unit mounted in the front end of said elongated base and adapted for stripping off an insulator of a coaxial cable;

a second stripper unit mounted in the rear ends of said elongated base and said pivoted arm and adapted for stripping off an insulator of an electric wire or telephone line, or an insulator of individual conductors of an electric wire or telephone line; and lock means mounted in the rear ends of said pivoted arm and said elongated base, and controlled to lock the rear ends of said pivoted arm and said elongated base together.

2. The wire stripper of claim 1 wherein said first stripper unit comprises a trough disposed at the front end of said elongated base, a downward opening chamber at the front end of said pivoted arm corresponding to the trough of said elongated base, a transverse wire groove at a bottom side of said downward opening chamber, and a wire stripping jaw set mounted in said trough and adapted for stripping off an insulator of a coaxial cable.

3. The wire stripper of claim 1 wherein said lock means comprises a hook raised from the rear end of said elongated base, a top recess at the rear end of said pivoted arm, a through hole through said top recess, and a retainer block disposed in said through hole, said retainer block having two springy locating strips, each of said strips raised from respective two opposite sides and stopped at a periphery of said through hole to hold said retainer block in said through hole, and a hooked portion at a bottom side of said retainer block for engagement with said hook to hold the rear ends of said elongated base and said pivoted arm closed together.

4. The wire stripper of claim 1 wherein said second stripper unit comprises two cutter chambers respectively disposed at the rear ends of said elongated base and said pivoted arm, a pair of first cutters and a pair of second cutters respectively and fixedly mounted in said cutter chambers.

5. The wire stripper of claim 1 further comprising a cutting element mounted in the rear end of said elongated base and moved with it relative to the rear end of said pivoted arm for cutting conductor(s) of an electric wire or telephone line.

6. The wire stripper of claim 4 wherein said first cutters have a respective straight cutting edge acting against each other; said second cutters have a respective notched cutting edge acting against each other.

\* \* \* \* \*